Aug. 9, 1938.    D. G. PUDERBAUGH    2,126,501
PAINTER'S GUIDE
Filed July 19, 1937    2 Sheets-Sheet 1
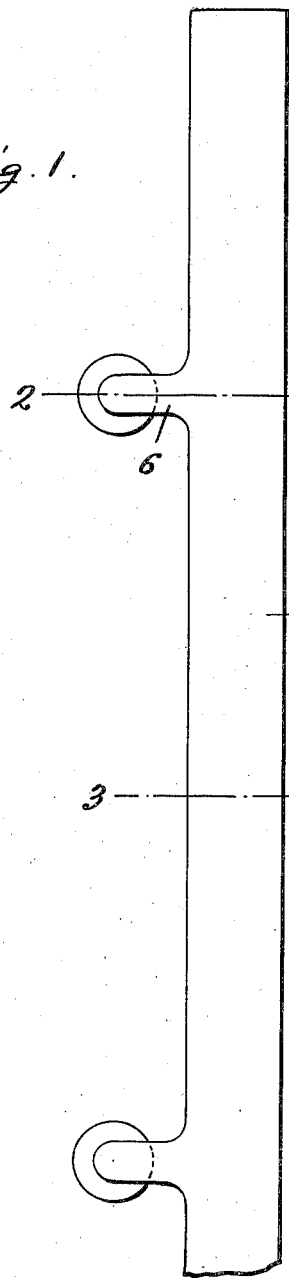
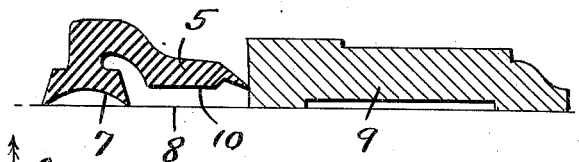
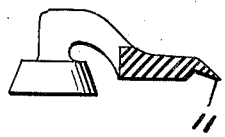
Inventor
David George Puderbaugh
By Clarence A. O'Brien
Hyman Berman
Attorneys Aug. 9, 1938.   D. G. PUDERBAUGH   2,126,501
PAINTER'S GUIDE
Filed July 19, 1937   2 Sheets-Sheet 2

Inventor
David George Puderbaugh
By Clarence A. O'Brien
Hyman Berman
Attorneys

Patented Aug. 9, 1938

2,126,501

UNITED STATES PATENT OFFICE 2,126,501

PAINTER'S GUIDE

David George Puderbaugh, Altoona, Pa.

Application July 19, 1937, Serial No. 154,523

1 Claim. (Cl. 91—65)

The present invention relates to guides for use by painters to protect the mullions, inside trim or other surface while painting the same.

A further object is to provide a guide of this character embodying suction cups for removably securing the same adjacent the work and which permits the same to be easily and quickly placed in position or moved into a new position as the work progresses.

A still further object is to provide a device of this character of simple and practical construction, which is strong and durable, relatively inexpensive to manufacture and otherwise well adapted for the purposes for which the same was intended.

Other objects and advantages reside in the details of construction as more fully hereinafter described and claimed, reference being had to the accompanying drawings forming part hereof, wherein like numerals refer to like parts throughout and in which Figure 1 is a fragmentary plan view of the guide.

Figure 2 is a transverse sectional view taken substantially on a line 2—2 of Fig. 1.

Figure 3 is a similar view taken on a line 3—3 of Fig. 1.

Figure 4:
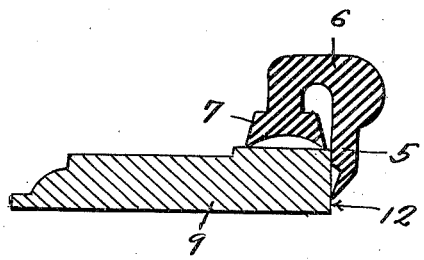
Figures 4, 5, 6 and 7 are transverse sectional views of the guide illustrating modified forms thereof for use in protecting various parts of the trim while painting the same.
Figure 5:
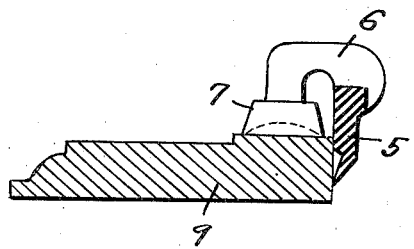

Referring now to the drawings in detail, and with particular reference to Figs. 1 to 3 inclusive, the invention comprises a guide blade indicated generally at 5, preferably formed of substantially hard rubber, said guide being of substantially elongated flat formation and at its rear edge provided at spaced intervals with laterally extending raised projections 6 having suction cups 7 formed integrally therewith and preferably formed of relatively soft rubber to secure the guide to the surface of a wall or the like designated by the numeral 8 at a point adjacent the trim or moulding 9.

The guide 5 is shaped in the form of a blade which includes a base 10 and its front edge bevelled to form a substantially sharpened edge 11 extending downwardly or inwardly toward the base 10 as will be apparent from an inspection of Figs. 2 and 3 of the drawings.

Figure 7:
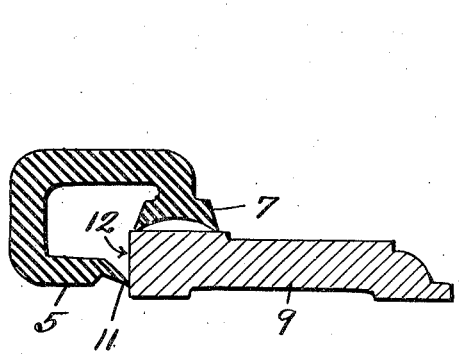
Figure 6:
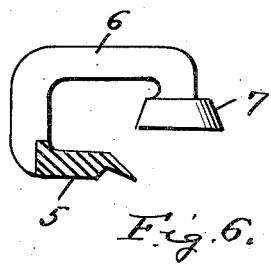

In the form of the invention illustrated in Figs. 4 to 7 inclusive the blade 5 is shown extending angularly with respect to the suction cup 7 in a position to lie flatly against the end surface 12 of the moulding 9 when the suction cup is secured to the outer surface thereof and in Figs. 6 and 7 a further modification is shown in which the blade 5 is supported outwardly from the moulding 9 in a plane substantially parallel thereto and with the sharpened edge 11 thereof extending inwardly toward and bearing against the side edge 12 of the moulding.

From the foregoing it is believed the details of construction and manner of use of the guide will be readily understood without further detailed explanation although it might be added that the suction cup 7 provides means for securing the guide in any desired position with respect to the trim or moulding 9 so that the blade portion 5 will serve as a guide while painting certain portions of the moulding.

What is claimed is:—

A painter's guide comprising an elongated substantially flat hard rubber blade having one longitudinal edge thereof reduced and tapered to form a sharpened edge extending the full length of said blade and extending outwardly and downwardly from a top face of the blade, relatively soft rubber extensions formed on the longitudinal edge of said blade opposite to the first-mentioned longitudinal edge of said blade and each including portions arranged angularly to each other and to the blade, and suction cups integral with the free ends of said extensions to grip a support for detachably securing the blade thereto, said extensions permitting the blade to be manually moved towards and from a selected face of said support without detaching the cups from the support and normally acting to urge the blade against the selected surface of the support.

DAVID GEORGE PUDERBAUGH.